United States Patent
Hong et al.

(10) Patent No.: US 9,288,041 B2
(45) Date of Patent: Mar. 15, 2016

(54) APPARATUS AND METHOD FOR PERFORMING COMPRESSION OPERATION IN HASH ALGORITHM

(71) Applicant: ELECTRONICS AND TELECOMMUNICATIONS RESEARCH INSTITUTE, Daejeon (KR)

(72) Inventors: Deukjo Hong, Daejeon (KR); Dong-Chan Kim, Daejeon (KR); Jung Keun Lee, Daejeon (KR); Daesung Kwon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 114 days.

(21) Appl. No.: 14/155,756

(22) Filed: Jan. 15, 2014

(65) Prior Publication Data

US 2014/0355755 A1    Dec. 4, 2014

(30) Foreign Application Priority Data

May 29, 2013 (KR) .................. 10-2013-0060863

(51) Int. Cl.
*H04L 9/06* (2006.01)
(52) U.S. Cl.
CPC ........... *H04L 9/0643* (2013.01); *H04L 2209/38* (2013.01)
(58) Field of Classification Search
CPC .................... H04L 9/0643; H04L 2209/38
USPC ....................................................... 380/28
See application file for complete search history.

(56) References Cited

U.S. PATENT DOCUMENTS

| 5,897,662 A * | 4/1999 | Corrigan et al. ............. 711/173 |
| 2006/0034456 A1* | 2/2006 | McGough ...................... 380/30 |
| 2010/0135484 A1 | 6/2010 | Nishikawa et al. |
| 2012/0128151 A1* | 5/2012 | Boehm et al. ................... 380/42 |
| 2012/0257742 A1* | 10/2012 | Ebeid et al. .................... 380/28 |

FOREIGN PATENT DOCUMENTS

| JP | 2010-128392 A | 6/2010 |
| KR | 10-0916805 B1 | 9/2009 |

OTHER PUBLICATIONS

Deukjo Hong et al., "A New Dedicated 256-Bit Hash Function: FORK-256," FSE 2006, LNCS 4047, pp. 195-209, 2006.

* cited by examiner

*Primary Examiner* — Kambiz Zand
*Assistant Examiner* — Benjamin Kaplan
(74) *Attorney, Agent, or Firm* — LRK Patent Law Firm

(57) ABSTRACT

An apparatus and method for performing a compression operation in a fast message hash algorithm, which receive a 512-bit message and 512-bit chaining variable data, repeatedly calculate a 128-bit register-based step function, and then produce updated 512-bit chaining variable data. For this, the apparatus for performing a compression operation in a hash algorithm includes a message extension unit for receiving a message and generating a plurality of extended messages. A chaining variable initial conversion unit receives chaining variable data and converts the chaining variable data into initial state data. A step function operation unit repeatedly calculates a step function based on the initial state data and the plurality of extended messages and produces final state data. A chaining variable final conversion unit generates updated chaining variable data from the chaining variable data using the final state data, and outputs the updated chaining variable data.

10 Claims, 4 Drawing Sheets

APPARATUS AND METHOD FOR PERFORMING COMPRESSION OPERATION IN HASH ALGORITHM

CROSS REFERENCE TO RELATED APPLICATION

This application claims the benefit of Korean Patent Application No. 10-2013-0060863 filed on May 29, 2013, which is hereby incorporated by reference in its entirety into this application.

BACKGROUND OF THE INVENTION

1. Technical Field

The present invention relates generally to an apparatus and method for performing a compression operation in a hash algorithm and, more particularly, to an apparatus and method for performing a compression operation in a fast message hash algorithm, which receive a 512-bit message and 512-bit chaining variable data, repeatedly calculate a 128-bit register-based step function, and then produce updated 512-bit chaining variable data which is a basis for the hash value.

2. Description of the Related Art

The provision of integrity of messages is the principal function of a cryptographic application for performing communication between various types of devices and storing the data of the devices. A hash function is a function for guaranteeing the integrity of messages, which is widely used in the signature, authentication, etc. of messages. Generally, in a hash function, chaining variable data is used, and is updated in such a way that a message is divided into units of a specific length and individual message units are input, together with the chaining variable data, to a compression function. Final chaining variable data output from the compression function is processed by various algorithms and then becomes a hash value for the corresponding message.

In relation to this, Korean Patent No. 10-0916805 entitled "Hash algorithm having 256-bit output" presents a hash algorithm technique for calculating a chaining variable by receiving a message bit stream having a predetermined length, converting the bit stream into a word stream, converting an input message into preset bits, and performing a compression operation.

In order to improve the speed efficiency of such a hash function, there is a need to design a compression function which is a core algorithm of the hash function so that the compression function can be optimally implemented for a chip or a Central Processing Unit (CPU) specified for a cryptographic application.

SUMMARY OF THE INVENTION

Accordingly, the present invention has been made keeping in mind the above problems occurring in the prior art, and an object of the present invention is to provide a technique for calculating a 128-bit register-based compression function that is applied to a hash function enabling fast message hashing while having a 512-bit output value and guaranteeing security against an existing attack.

In accordance with an aspect of the present invention to accomplish the above object, there is provided an apparatus for performing a compression operation in a hash algorithm, including a message extension unit for receiving a message and generating a plurality of extended messages; a chaining variable initial conversion unit for receiving chaining variable data and converting the chaining variable data into initial state data; a step function operation unit for repeatedly calculating a step function based on the initial state data and the plurality of extended messages and then producing final state data; and a chaining variable final conversion unit for generating updated chaining variable data from the chaining variable data using the final state data, and outputting the updated chaining variable data.

Preferably, the message extension unit may receive a 512-bit message ($M=M[0]\|M[1]\|\ldots\|M[14]\|M[15]$) configured by connecting 16, 32-bit sub-messages ($M[0], M[1], \ldots, M[14]$, and $M[15]$), and generate 32, 384-bit extended messages ($W_r=W_r[0]\|W_r[1]\|\ldots\|W_r[10]\|W_r[11]$), each being configured by connecting 12, 32-bit sub-extended messages ($W_r[0], W_r[1], \ldots, W_r[10]$, and $W_r[11]$) based on equation ($W_r[i]=M[(12r+i) \bmod 16]$, $0 \le i \le 11$), where r is an integer satisfying $0 \le r \le 31$, and x mod 16 denotes an operation of outputting a remainder of division when x is divided by 16.

Preferably, the chaining variable initial conversion unit may receive 512-bit chaining variable data ($CV=CV[0]\|CV[1]\|\ldots\|CV[14]\|CV[15]$) configured by connecting 16 pieces of 32-bit sub-chaining variable data $CV[0], CV[1], \ldots, CV[14]$, and $CV[15]$), and convert the 512-bit chaining variable data into 512-bit initial state data ($X_0=X_0[0]\|X_0[1]\|\ldots\|X_0[14]\|X_0[15]$) configured by connecting 16 pieces of 32-bit initial sub-state data ($X_0[0], X_0[1], \ldots, X_0[14]$, and $X_0[15]$) based on equation ($X_0[i]=CV[i]$, $0 \le i \le 15$).

Preferably, the step function operation unit may produce the final state data by repeatedly calculating the step function calculating the following equations $T_r[i]=X_r[i] \oplus W_r[i]$, $0 \le i \le 11$; $X_{r+1}[i]=ROL_9(T_r[i] \boxplus T_r[i+4]), 0 \le i \le 3$; $X_{r+1}[i]=ROL_{27}(T_r[i] \boxplus T_r[i+4]), 4 \le i \le 7$; $X_{r+1}[i]=ROL_{29}(T_r[i] \boxplus X_r[i+4]), 8 \le i \le 11$; and $X_{r+1}[i]=T_r[i-12]$, $12 \le i \le 15$, based on the 512-bit initial state data ($X_0=X_0[0]\|X_0[1]\|\ldots\|X_0[14]\|X_0[15]$) and the 32, 384-bit extended messages ($W_r=W_r[0]\|W_r[1]\|\ldots\|W_r[10]\|W_r[11]$). In this case, $x \oplus y$ denotes an exclusive OR operation on x and y which respectively have 32-bit values, $x \boxplus y$ denotes an operation of outputting a remainder of division when a sum of values representing the 32-bit x and y by positive integers, respectively, is divided by $2^{32}$, in 32 bits, and $ROL_a(x)$ denotes an operation of cyclically shifting the 32-bit x to left by 'a' bits and outputting a shifted value.

Preferably, the step function operation unit may repeatedly calculate the step function, for r, 32 times from 0 to 31 rounds and produce 512-bit final state data ($X_{32}=X_{32}[0]\|X_{32}[1]\|\ldots\|X_{32}[14]\|X_{32}[15]$) configured by connecting 16 pieces of 32-bit final sub-state data ($X_{32}[0], X_{32}[1], \ldots, X_{32}[14]$, and $X_{32}[15]$).

Preferably, the chaining variable final conversion unit may update the 512-bit chaining variable data ($CV=CV[0]\|CV[1]\|\ldots\|CV[14]\|CV[15]$) based on equation ($CV'[i]=CV[i] \oplus X_{32}[i]$, $0 \le i \le 15$), and output the updated 512-bit chaining variable data ($CV'=CV'[0]\|CV'[1]\|\ldots\|CV'[14]\|CV'[15]$).

In accordance with another aspect of the present invention to accomplish the above object, there is provided a method of performing a compression operation in a hash algorithm, including receiving a message and generating a plurality of extended messages; receiving chaining variable data and converting the chaining variable data into initial state data; repeatedly calculating a step function based on the initial state data and the plurality of extended messages, and then producing final state data; and generating updated chaining variable data from the chaining variable data using the final state data, and outputting the updated chaining variable data.

Preferably, generating the plurality of extended messages may be configured to receive a 512-bit message ($M=M[0]\|M[1]\|\ldots\|M[14]M[15]$) configured by connecting 16, 32-bit sub-messages ($M[0], M[1], \ldots, M[14]$, and $M[15]$), and generate 32, 384-bit extended messages ($W_r=W_r[0]\|W_r[1]\|\ldots\|W_r[10]\|W_r[11]$), each being configured by connecting 12, 32-bit sub-extended messages ($W_r[0]$, $W_r[1]$, ..., $W_r[10]$, and $W_r[11]$), based on equation ($W_r[i]=M[(12r+i) \bmod 16]$, $0 \le i \le 11$), where r is an integer satisfying $0 \le r \le 31$, and x mod 16 denotes an operation of outputting a remainder of division when x is divided by 16.

Preferably, receiving the chaining variable data and converting the chaining variable data into the initial state data may be configured to receive 512-bit chaining variable data ($CV=CV[0]\|CV[1]\|\ldots\|CV[14]\|CV[15]$) configured by connecting 16 pieces of 32-bit sub-chaining variable data $CV[0], CV[1], \ldots, CV[14], CV[15]$), and convert the 512-bit chaining variable data into 512-bit initial state data ($X_0=X_0[0]\|X_0[1]\|\ldots\|X_0[14]\|X_0[15]$) configured by connecting 16 pieces of 32-bit initial sub-state data ($X_0[0], X_0[1], \ldots, X_0[14]$, and $X_0[15]$) based on equation ($X_0[i]=CV[i]$, $0 \le i \le 15$).

Preferably, repeatedly calculating the step function and producing the final state data may be configured to produce the final state data by repeatedly calculating the step function calculating the following equations $T_r[i]=X_r[i] \oplus W_r[i]$, $0 \le i \le 11$; $X_{r+1}[i]=ROL_9(T_r[i] \boxplus T_r[i+4])$, $0 \le i \le 3$; $X_{r+1}[i]=ROL_{27}(T_r[i] \boxplus T_r[i+4])$, $4 \le i \le 7$; $X_{r+1}[i]=ROL_{29}(T_r[i] \boxplus X_r[i+4])$, $8 \le i \le 11$; and $X_{r+1}[i]=T_r[i-12]$, $12 \le i \le 15$, based on the 512-bit initial state data ($X_0=X_0[0]\|X_0[1]\|\ldots\|X_0[14]\|X_0[15]$) and the 32, 384-bit extended messages ($W_r=W_r[0]\|W_r[1]\|\ldots\|W_r[10]\|W_r[11]$). In this case, $x \oplus y$ denotes an exclusive OR operation on x and y which respectively have 32-bit values, $x \boxplus y$ denotes an operation of outputting a remainder of division when a sum of values representing the 32-bit x and y by positive integers, respectively, is divided by $2^{32}$, in 32 bits, and $ROL_a(x)$ denotes an operation of cyclically shifting the 32-bit x to left by 'a' bits and outputting a shifted value.

Preferably, repeatedly calculating the step function and producing the final state data may be configured to repeatedly calculate the step function, for r, 32 times from 0 to 31 rounds and produce 512-bit final state data ($X_{32}=X_{32}[0]\|X_{32}[1]\|\ldots\|X_{32}[14]\|X_{32}[15]$) configured by connecting 16 pieces of 32-bit final sub-state data ($X_{32}[0], X_{32}[1], \ldots, X_{32}[14]$, and $X_{32}[15]$).

Preferably, generating and outputting the updated chaining variable data from the chaining variable data may be configured to update the 512-bit chaining variable data ($CV=CV[0]\|CV[1]\|\ldots\|CV[14]\|CV[15]$) based on equation ($CV'[i]=CV[i] \oplus X_{32}[i]$, $0 \le i \le 15$), and output the updated 512-bit chaining variable data ($CV'=CV'[0]\|CV'[1]\|\ldots\|CV'[14]\|CV'[15]$).

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
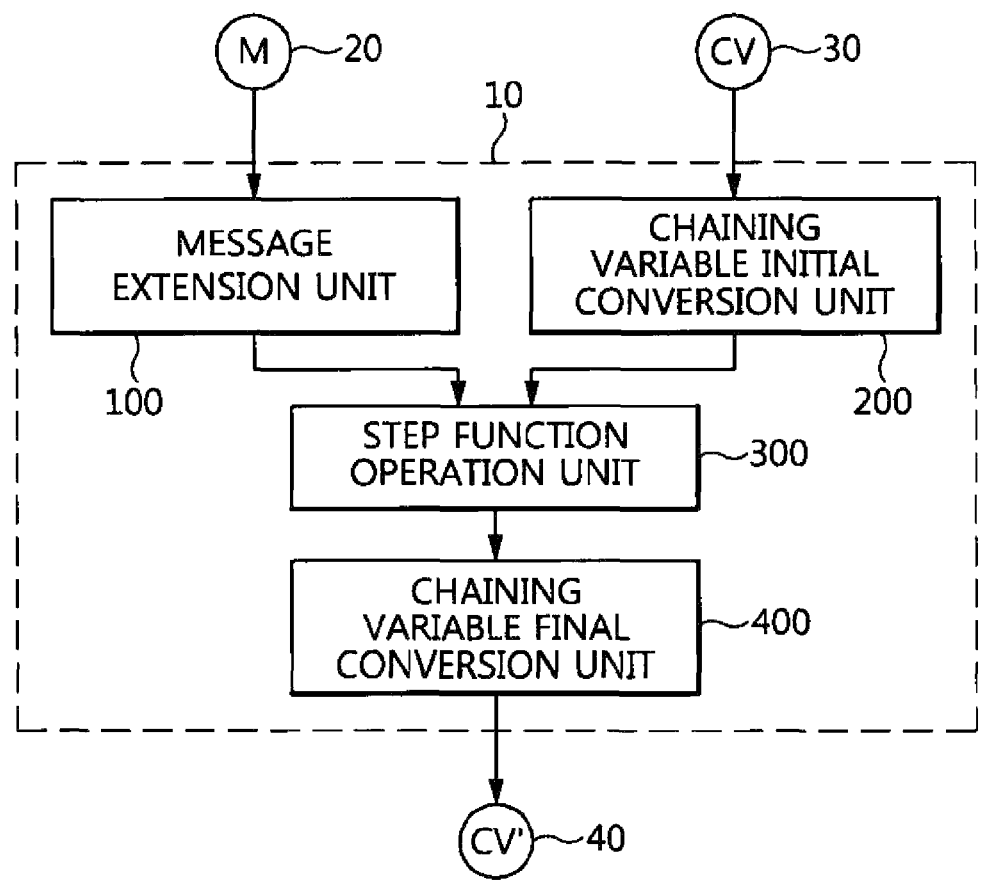
FIG. 1 is a block diagram showing the configuration of an apparatus for performing a compression operation in a hash algorithm according to an embodiment of the present invention.

The present invention will be described in detail below with reference to the accompanying drawings. In the following description, redundant descriptions and detailed descriptions of known functions and elements that may unnecessarily make the gist of the present invention obscure will be omitted. Embodiments of the present invention are provided to fully describe the present invention to those having ordinary knowledge in the art to which the present invention pertains. Accordingly, in the drawings, the shapes and sizes of elements may be exaggerated for the sake of clearer description.

Hereinafter, the configuration and operation of an apparatus for performing a compression operation in a hash algorithm according to the present invention will be described in detail with reference to FIGS. 1 and 2.

FIG. 1 is a block diagram showing the configuration of an apparatus for performing a compression operation in a hash algorithm according to an embodiment of the present invention.

Referring to FIG. 1, an apparatus 10 for performing a compression operation according to the present invention includes a message extension unit 100, a chaining variable initial conversion unit 200, a step function operation unit 300, and a chaining variable final conversion unit 400. The message extension unit 100 externally receives a message M 20 and generates a plurality of extended messages. The chaining variable initial conversion unit 200 externally receives chaining variable data CV 30 and converts the chaining variable data into initial state data of a step function. The step function operation unit 300 repeatedly calculates the step function based on the plurality of extended messages generated by the message extension unit 100 and the initial state data output from the chaining variable initial conversion unit 200, and then produces final state data. The chaining variable final conversion unit 400 outputs chaining variable data CV' 40 obtained by updating the chaining variable data CV 30 input to the chaining variable initial conversion unit 200 using the final state data produced by the step function operation unit 300.

The message extension unit 100 receives the message M having 512 bits from a user through an interface (not shown) separately provided in the compression operation performance apparatus 10, and generates 32 extended messages $W_0, W_1, \ldots, W_{30}$, and $W_{31}$ ($W_r$, $0 \le r \le 31$), each having 384 bits, from the message M. In this case, the 512-bit message M input to the message extension unit 100 is configured by connecting 16 sub-messages $M[0], M[1], \ldots, M[14]$, and $M[15]$, each having 32 bits, as represented by the following Equation (1):

$$M=M[0]\|M[1]\|\ldots\|M[14]\|M[15] \quad (1)$$

The message extension unit 100 generates extended messages $W_r$ ($0 \le r \le 31$), each having 384 bits, which are configured by connecting 12 sub-extended messages $W_r[0]$, $W_r[1], \ldots, W_r[10]$, and $W_r[11]$, each having 32 bits, as represented by the following Equation (2) from the input 512-bit message $M=M[0]\|M[1]\|\ldots\|M[14]\|M[15]$.

$$W_r=W_r[0]\|W_r[1]\|\ldots\|W_r[10]\|W_r[11], 0 \le r \le 31 \quad (2)$$

In this case, the message extension unit 100 generates a total of 32, 384-bit extended messages $W_0, W_1, \ldots, W_{30}$, and $W_{31}$ ($W_r$=$W_r[0]$||$W_r[1]$|| ... ||$W_r[10]$||$W_r[11]$, 0≤r≤31) from the 512-bit message M=M[0]||M[1]|| ... ||M[14]||M[15] based on the following Equation (3):

$$W_r[i]=M[(12r+i) \bmod 16], 0 \le i \le 11 \quad (3)$$

where (12r+1) mod 16 denotes an operation of outputting the remainder of division when (12r+1) is divided by 16. Meanwhile, the message extension unit 100 outputs the 32, 384-bit extended messages $W_0$, $W_1$, ..., $W_{30}$, and $W_{31}$ ($W_r$=$W_r[0]$||$W_r[1]$|| ... ||$W_r[10]$||$W_r[11]$, 0≤r≤31) generated from the input 512-bit message M=M[0]||M[1]|| ... ||M[14]||M[15] to the step function operation unit 300.

The chaining variable initial conversion unit 200 receives chaining variable data CV having 512 bits from an interface separately provided in the compression operation performance apparatus 10 or a chaining variable generation means (not shown) located outside of the apparatus, and converts the chaining variable data into initial state data $X_0$ having 512 bits. In this case, the 512-bit chaining variable data CV that is input to the chaining variable initial conversion unit 200 is configured by connecting 16 pieces of sub-chaining variable data CV[0], CV[1], ..., CV[14], and CV[15], each having 32 bits, as represented by the following Equation (4):

$$CV=CV[0]||CV[1]|| ... ||CV[14]||CV[15] \quad (4)$$

The chaining variable initial conversion unit 200 converts the input 512-bit chaining variable data CV=CV[0]||CV[1]|| ... ||CV[14]||CV[15] into initial state data $X_0$ having 512 bits, configured by connecting 16 pieces of initial sub-state data $X_0[0]$, $X_0[1]$, ..., $X_0[14]$, and $X_0[15]$, each having 32 bits, as represented by the following Equation (5):

$$X_0=X_0[0]||X_0[1]|| ... X_0[14]||X_0[15] \quad (5)$$

In this case, the chaining variable initial conversion unit 200 converts the 512-bit chaining variable data CV=CV[0]||CV[1]λ ... CV[14]||CV[15] into 512-bit initial state data $X_0$=$X_0[0]$||$X_0[1]$|| ... ||$X_0[14]$||$X_0[15]$ based on the following Equation (6):

$$X_0[i]=CV[i], 0 \le i \le 15 \quad (6)$$

The chaining variable initial conversion unit 200 outputs the 512-bit initial state data $X_0$=$X_0[0]$||$X_0[1]$|| ... ||$X_0[14]$||$X_0[15]$ converted from the input 512-bit chaining variable data CV=CV[0]||CV[1]|| ... ||CV[14]||CV[15] to the step function operation unit 300.

The step function operation unit 300 repeatedly calculates the step function on which operations in the following Equations (7) to (11) are performed by setting the 512-bit initial state data $X_0$=$X_0[0]$||$X_0[1]$|| ... ||$X_0[14]$||$X_0[15]$ received from the chaining variable initial conversion unit 200 to an initial value and by utilizing the 32, 384-bit extended messages $W_0$, $W_1$, ..., $W_{30}$, and $W_{31}$ ($W_r$=$W_r[0]$||$W_r[1]$|| ... ||$W_r[10]$||$W_r[11]$, 0≤r≤31) received from the message extension unit 100, and thus produces the final state data.

$$T_r[i]=X_r[i] \oplus W_r[i], 0 \le i \le 11 \quad (7)$$

$$X_{r+1}[i]=ROL_9(T_r[i] \boxplus T_r[i+4]), 0 \le i \le 3 \quad (8)$$

$$X_{r+1}[i]=ROL_{27}(T_r[i] \boxplus T_r[i+4]), 4 \le i \le 7 \quad (9)$$

$$X_{r+1}[i]=ROL_{29}(T_r[i] \boxplus X_r[i+4]), 8 \le i \le 11 \quad (10)$$

$$X_{r+1}[i]=T_r[i-12], 12 \le i \le 15 \quad (11)$$

In this case, x⊕y denotes an Exclusive OR (XOR) operation on x and y which have 32-bit values, x⊞y denotes an operation of outputting the remainder of division when the sum of values representing the 32-bit x and y by positive integers, respectively, is divided by $2^{32}$, in 32 bits, and $ROL_a$(x) denotes an operation of cyclically shifting the 32-bit variable x to the left by 'a' bits and outputting a shifted value. In this case, the step function operation unit 300 may first perform an operation based on Equation (7) in the step function in an n(1≤n≤32)-th round and may subsequently perform operations based on Equations (8) to (11) in parallel. The step function operation unit 300 repeatedly calculates the step function, shown in Equations (7) to (11), 32 times, and connects resulting values $X_{32}[0]X_{32}[1]$, ..., $X_{32}[14]$, and $X_{32}[15]$ obtained by calculating the step function in a 32-th round, as given by the following Equation (12), and thus produces the final state data $X_{32}$. The step function operation unit 300 outputs the final state data $X_{32}$ produced by repeatedly calculating the step function to the chaining variable final conversion unit 400.

$$X_{32}=X_{32}[0]||X_{32}[1]|| ... ||X_{32}[14]||X_{32}[15] \quad (12)$$

Figure 2:
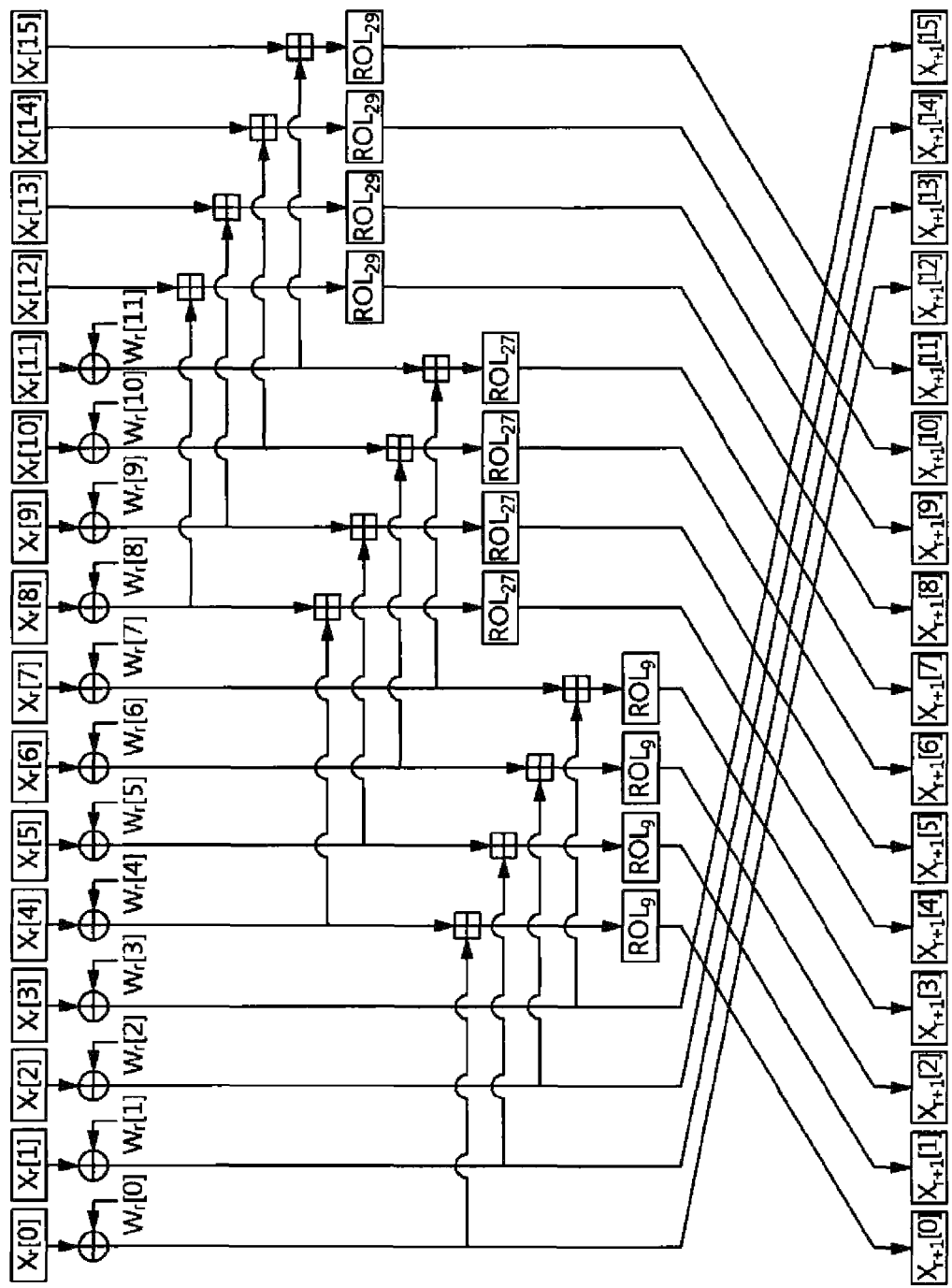
FIG. 2 is a diagram illustrating an operation of a step function performed by the step function operation unit shown in FIG. 1.

Meanwhile, an operation performed by the step function operation unit 300 to produce pieces, of sub-state data $X_{r+1}[0]$, $X_{r+1}[1]$, ..., $X_{r+1}[14]$, and $X_{r+1}[15]$ by calculating the step function in an (r+1)-th round using both the pieces of sub-state data $X_r[0]$, $X_r[1]$, ..., $X_r[14]$, and $X_r[15]$ and the sub-extended messages $W_r[0]$, $W_r[1]$, ..., $W_r[10]$, and $W_r[11]$ as input values may be illustrated in FIG. 2.

The chaining variable final conversion unit 400 updates the chaining variable data CV=CV[0]||CV[1]|| ... ||CV[14]||CV[15] input to the chaining variable initial conversion unit 200 using the final state data $X_{32}$=$X_{32}[0]$||$X_{32}[1]$|| ... ||$X_{32}[14]$||$X_{32}[15]$ received from the step function operation unit 300, and outputs the updated chaining variable data CV'=CV'[0]||CV'[1]|| ... ||CV'[14]||CV'[15]. In this case, the chaining variable final conversion unit 400 generates the chaining variable data CV'=CV'[0]||CV'[1]|| ... ||CV'[14]||CV'[15] by updating the 512-bit chaining variable data CV=CV[0]||CV[1]|| ... ||CV[14]||CV[15], based on the following Equation (13).

$$CV'[i]=CV[i] \oplus X_{32}[i], 0 \le i \le 15 \quad (13)$$

The updated 512-bit chaining variable data CV'=CV'[0]||CV'[1]|| ... ||CV'[14]||CV'[15] output from the chaining variable final conversion unit 400 is processed using various types of known algorithms and is used as a hash value for the 512-bit message M=M[0]||M[1]|| ... ||M[14]||M[15] that is input to the message extension unit 100.

Hereinafter, a compression operation performance method performed by the apparatus for performing the compression operation in the hash algorithm according to the present invention will be described in detail with reference to FIGS. 3 and 4. A detailed description of some parts identical to the operation of the compression operation performance apparatus 10 according to the present invention, which has been described with reference to FIGS. 1 and 2, will be omitted here.

Figure 3:
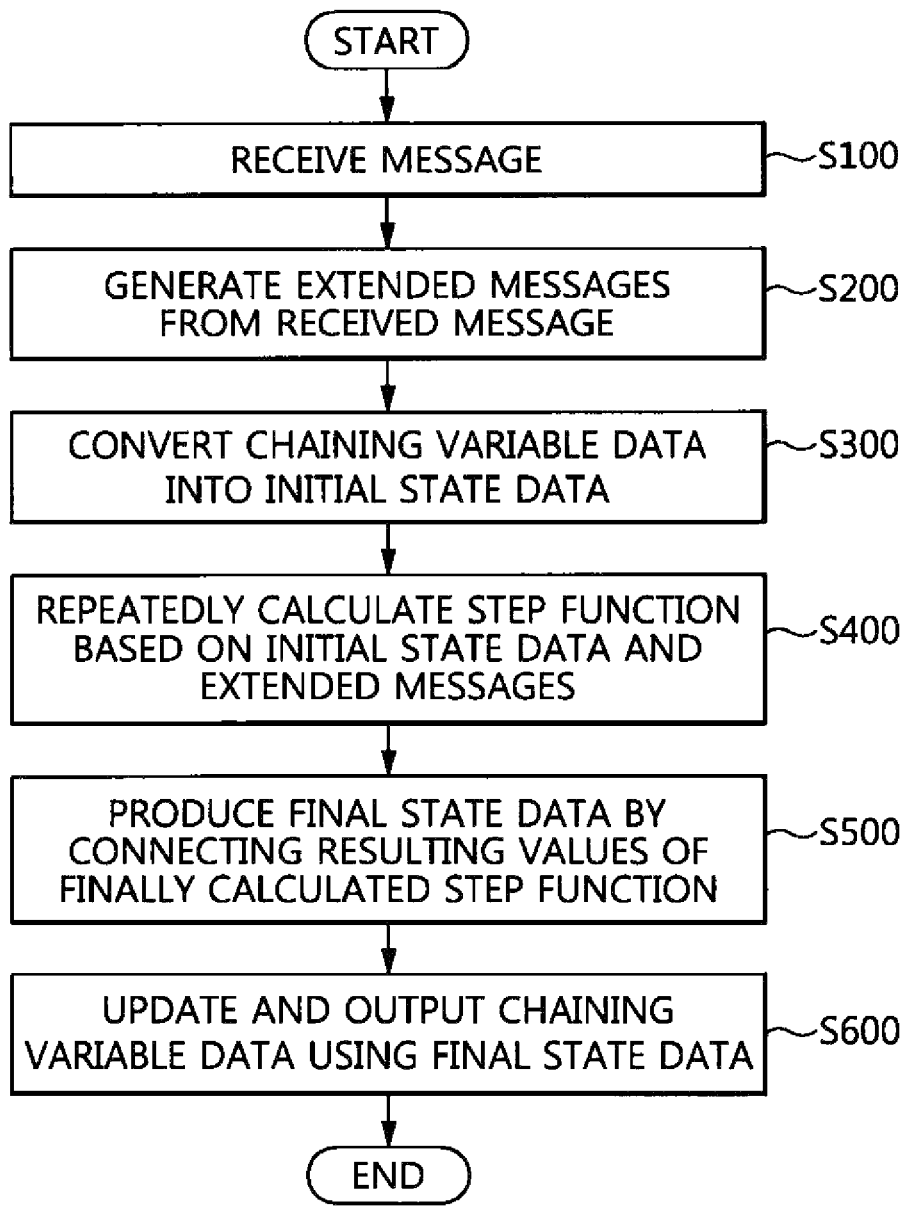
FIG. 3 is a flowchart showing a method of performing a compression operation in a hash algorithm according to the present invention.

FIG. 3 is a flowchart showing a method of performing a compression operation in a hash algorithm according to the present invention.

Referring to FIG. 3, in the compression operation performance method according to the present invention, the message extension unit 100 receives a 512-bit message M=M[0]||M[1]|| ... ||M[14]||M[15] which is a target to be compressed and encrypted through a user interface at step S100.

Next, the message extension unit 100 generates 32, 384-bit extended messages $W_0$, $W_1$, ..., $W_{30}$, and $W_{31}$ ($W_r$=$W_r[0]$||$W_r[1]$|| ... ||$W_r[10]$||$W_r[11]$, 0≤r≤31), each being configured by connecting 12, 32-bit sub-extended messages $W_r[0]$, $W_r[1]$, ..., $W_r[10]$, and $W_r[11]$, from the 512-bit message M=M[0]||M[1]|| ... ||M[14]||M[15] that is configured by connecting 16, 32-bit sub-messages M[0], M[1], ..., M[14], and M[15], based on Equation (3) at step S200. In this case, the message extension unit 100 outputs the generated 32, 384-bit extended messages of $W_r$ ($0 \leq r \leq 31$) to the step function operation unit 300.

Meanwhile, the chaining variable initial conversion unit 200 receives 512-bit chaining variable data CV=CV[0]||CV[1]|| ... ||CV[14]||CV[15] configured by connecting 16 pieces of 32-bit sub-chaining variable data CV[0], CV[1], ..., CV[14], and CV[15] from the user interface or an external chaining variable generation means, and converts the 512-bit chaining variable data CV=CV[0]||CV[1]|| ... ||CV[14]||CV[15] into 512-bit initial state data $X_0$=$X_0$[0]||$X_0$[1]|| ... $X_0$[14]||$X_0$[15] configured by connecting 16 pieces of 32-bit initial sub-state data $X_0$[0], $X_0$[1], ..., $X_0$[14], and $X_0$[15] based on Equation (6) at step S300. In this case, the chaining variable initial conversion unit 200 outputs the converted 512-bit initial state data $X_0$=$X_0$[0]||$X_0$[1]|| ... ||$X_0$[15] to the step function operation unit 300.

Next, the step function operation unit 300 repeatedly calculates the step function represented by Equations (7) to (11) based on the 32, 384-bit extended messages $W_r$ ($0 \leq r \leq 31$) received from the message extension unit 100 and the 512-bit initial state data $X_0$=$X_0$[0]||$X_0$[1]|| ... ||$X_0$[14]||$X_0$[15] received from the chaining variable initial conversion unit 200 at step S400. In this case, the step function operation unit 300 sets 16 pieces of 32-bit initial sub-state data $X_0$[0], $X_0$[1], ..., $X_0$[14], and $X_0$[15] to the input value of a step function in a first round, applies 12, 32-bit sub-extended messages $W_r$[0], $W_r$[1], ..., $W_r$[10], and $W_r$[11] to the step function upon calculating the step function in an (r+1)-th round, and then repeatedly calculates the step function 32 times.

Further, the step function operation unit 300 produces 512-bit final state data $X_{32}$=$X_{32}$[0]||$X_{32}$[1]|| ... ||$X_{32}$[14]||$X_{32}$[15] by connecting the results of the finally calculated step function (that is, the results of the step function calculated in a 32nd round; $X_{32}$[0], $X_{32}$[1], ..., $X_{32}$[14], and $X_{32}$[15]) at step S500. In this case, the step function operation unit 300 outputs the produced 512-bit final state data $X_{32}$=$X_{32}$[0]||$X_{32}$[1]|| ... ||$X_{32}$[14]||$X_{32}$[15] to, the chaining variable final conversion unit 400.

Finally, the chaining variable final conversion unit 400 updates the 512-bit chaining variable data CV=CV[0]||CV[1]|| ... ||CV[14]||CV[15] that is input to the chaining variable initial conversion unit 200 by using the 512-bit final state data $X_{32}$=$X_{32}$[0]||$X_{32}$[1]|| ... ||$X_{32}$[14]||$X_{32}$[15] received from the step function operation unit 300, and outputs the updated 512-bit chaining variable data at step S600. In this case, the chaining variable final conversion unit 400 updates the 512-bit chaining variable data CV=CV[0]||CV[1]|| ... ||CV[14]||CV[15] that is input to the chaining variable initial conversion unit 200 based on Equation (13), and generates and outputs the updated 512-bit chaining variable data CV'=CV'[0]||CV'[1]|| ... ||CV'[14]||CV'[15] at step S600.

Figure 4:
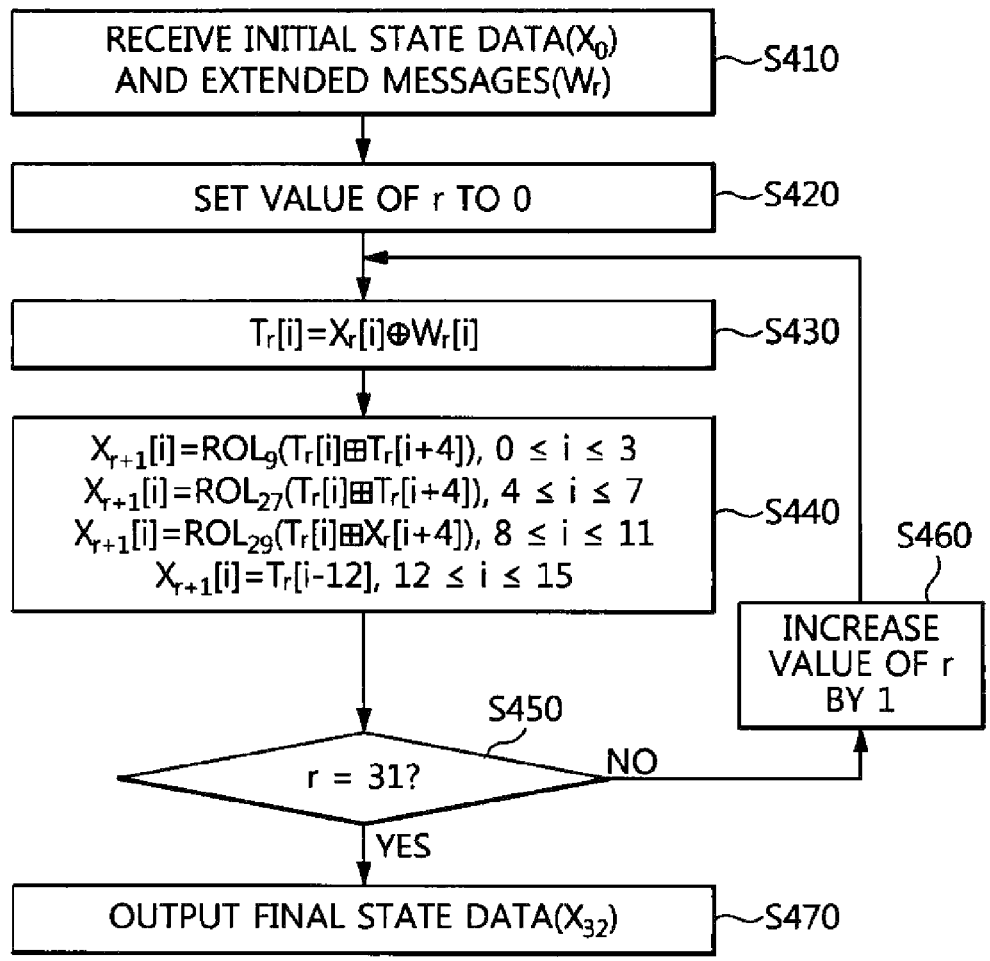
FIG. 4 is a flowchart showing in detail a process for repeatedly calculating a step function in the method of performing the compression operation in the hash algorithm according to the present invention shown in FIG. 3.

FIG. 4 is a flowchart showing a method of performing a compression operation in a hash algorithm according to the present invention shown in FIG. 3, which shows in detail the step S400 of repeatedly calculating the step function.

Referring to FIG. 4, at the step S400 of repeatedly calculating the step function, the step function operation unit 300 receives 32, 384-bit extended messages $W_r$ ($0 \leq r \leq 31$) from the message extension unit 100 while receiving 512-bit initial state data $X_0$=$X_0$[0]||$X_0$[1]|| ... ||$X_0$[14]||$X_0$[15] from the chaining variable initial conversion unit 200 at step S410.

Next, the step function operation unit 300 sets the value of r to 0, sets the pieces of initial-sub state data $X_0$[0], $X_0$[1], ..., $X_0$[14], and $X_0$[15] to input values, and starts to calculate the step function in a first round at step S420.

Further, upon calculating the step function in an (r+1)-th round, the step function operation unit 300 first calculates $T_r$[i] based on Equation (7) ($T_r$[i]=$X_r$[i]⊕$W_r$[i], $0 \leq i \leq 11$) at step S430, and calculates resulting values $X_{r+1}$[0], $X_{r+1}$[1], ..., $X_{r+1}$[14], and $X_{r+1}$[15] ($X_{r+1}$[i], $0 \leq i \leq 15$) based on Equation (8) ($X_{r+1}$[i]=$ROL_9$($T_r$[i]⊞$T_r$[i+4]),$0 \leq i \leq 3$), Equation (9) $X_{r+1}$[i]=$ROL_{27}$($T_r$[i]⊞T'[i+4]),$4 \leq i \leq 7$), Equation (10) ($X_{r+1}$[i]=$ROL_{29}$($T_r$[i]⊞$X_r$[i+4]),$8 \leq i \leq 11$), and Equation (11) ($X_{r+1}$[i]=$T_r$[i−12], $12 \leq i \leq 15$) at step S440.

Based on steps S430 and S440, the step function in the (r+1)-th round is calculated, and then it is determined whether the value of r is 31 at step S450.

If it is determined at step S450 that the value of r is not 31 (that is, if the value of r is less than 31), the step function operation unit 300 increases the value of r by 1 at step S460, and repeatedly calculates the step function at steps S430 and S440.

In contrast, if it is determined at step S450 that the value of r is 31, the resulting values $X_{32}$[0], $X_{32}$[1], ..., $X_{32}$[14], and $X_{32}$[15] output at the calculation of the step function in a 32-th round are connected, and then 512-bit final state data $X_{32}$=$X_{32}$[0]||$X_{32}$[1]|| ... ||$X_{32}$[14]$X_{32}$[15] is output at step S470.

In accordance with the present invention, there is an advantage in that a simple message extension algorithm is provided and in that a compression operation algorithm is provided in which only bit addition, bit cyclic shift (rotation), and bit Exclusive OR (XOR) operators which are generally used in most CPUs are combined, so that high-speed parallel processing using a 128-bit register is possible, thus enabling the CPUs to perform compression operations using a low computational load.

Meanwhile, the method of performing a compression operation in a hash algorithm according to the present invention may be implemented in the form of program instructions that are executable by various types of computer means, and may be recorded in a computer-readable storage medium. The computer-readable storage medium may include program instructions, data files, and data structures either alone or in combination. The program instructions stored in the medium may be designed and configured especially for the present invention or may be known to and usable by those skilled in the art of computer software. Examples of the computer-readable storage medium may include a magnetic medium such as a hard disk, a floppy disk, or magnetic tape, an optical medium such as Compact Disk-Read Only Memory (CD-ROM) or a Digital Versatile Disk (DVD), a magneto-optical medium such as a floptical disk, and a hardware device such as ROM, Random Access Memory (RAM), or flash memory which is especially configured to store and execute program instructions. Examples of the program instructions include not only such machine language code as created by a compiler, but also such high-level language code as being executable by a computer using an interpreter or the like.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. An apparatus for performing a compression operation in a hash algorithm, comprising:
    a message extension unit for receiving a message and generating 32, 384-bit extended messages;
    a chaining variable initial conversion unit for receiving chaining variable data and converting the chaining variable data into 512-bit initial state data;
    a step function operation unit for repeatedly calculating a step function based on the initial state data and the plurality of extended messages and then producing final state data, wherein:
    the step function operation unit produces the final state data by repeatedly calculating the step function based on the 512-bit initial state data ($X_0=X_0[0]\|X_0[1]\|\cdots\|X_0[14]\|X_0[15]$) and the 32, 384-bit extended messages ($W_r=W_r[0]\|W_r[1]\|\cdots\|W_r[10]\|W_r[11]$), and
    the step function is a function for calculating the following Equations (1) to (5):

$$T_r[i]=X_r[i]\oplus W_r[i], 0\le i\le 11 \quad (1)$$

$$X_{r+1}[i]=ROL_9(T_r[i]\boxplus T_r[i+4]), 0\le i\le 3 \quad (2)$$

$$X_{r+1}[i]=ROL_{27}(T_r[i]\boxplus T_r[i+4]), 4\le i\le 7 \quad (3)$$

$$X_{r+1}[i]=ROL_{29}(T_r[i]\boxplus X_r[i+4]), 8\le i\le 11 \quad (4)$$

$$X_{r+1}[i]=T_r[i-12], 12\le i\le 15 \quad (5)$$

where $x\oplus y$ denotes an exclusive OR operation on x and y which respectively have 32-bit values, $x\boxplus y$ denotes an operation of outputting a remainder of division when a sum of values representing the 32-bit x and y by positive integers, respectively, is divided by $2^{32}$, in 32 bits, and $ROL_a(x)$ denotes an operation of cyclically shifting the 32-bit x to left by 'a' bits and outputting a shifted value; and
    a chaining variable final conversion, unit for generating updated chaining variable data from the chaining variable data using the final state data, and outputting the updated chaining variable data.

2. The apparatus of claim 1, wherein the message extension unit receives a 512-bit message ($M=M[0]\|M[1]\|\ldots\|M[14]\|M[15]$) configured by connecting 16, 32-bit sub-messages ($M[0], M[1], \ldots, M[14]$, and $M[15]$), and generates 32, 384-bit extended messages ($W_r=W_r[0]\|W_r[1]\|\ldots\|W_r[10]\|W_r[11]$), each being configured by connecting 12, 32-bit sub-extended messages ($W_r[0], W_r[1], \ldots, W_r[10]$, and $W_r[11]$) based on equation ($W_r[i]=M[(12r+i) \bmod 16]$, $0\le i\le 11$), where r is an integer satisfying $0\le r\le 31$, and x mod 16 denotes an operation of outputting a remainder of division when x is divided by 16.

3. The apparatus of claim 2, wherein the chaining variable initial conversion unit receives 512-bit chaining variable data ($CV=CV[0]\|CV[1]\|\ldots\|CV[14]\|CV[15]$) configured by connecting 16 pieces of 32-bit sub-chaining variable data $CV[0], CV[1], \ldots, CV[14]$, and $CV[15]$), and converts the 512-bit chaining variable data into 512-bit initial state data ($X_0=X_0[0]\|X_0[1]\|\ldots\|X_0[14]\|X_0[15]$) configured by connecting 16 pieces of 32-bit initial sub-state data ($X_0[0], X_0[1], \ldots, X_0[14]$, and $X_0[15]$) based on equation ($X_0[i]=CV[i], 0\le i\le 15$).

4. The apparatus of claim 3, wherein the step function operation unit repeatedly calculates the step function, for r, 32 times from 0 to 31 rounds and produces 512-bit final state data ($X_{32}=X_{32}[0]\|X_{32}[1]\|\ldots\|X_{32}[14]\|X_{32}[15]$) configured by connecting 16 pieces of 32-bit final sub-state data ($X_{32}[0], X_{32}[1], \ldots, X_{32}[14]$, and $X_{32}[15]$).

5. The apparatus of claim 4, wherein the chaining variable final conversion unit updates the 512-bit chaining variable data ($CV=CV[0]\|CV[1]\|\ldots\|CV[14]\|CV[15]$) based on equation ($CV'[i]=CV[i]\oplus X_{32}[i], 0\le i\le 15$), and outputs the updated 512-bit chaining variable data ($CV'=CV'[0]\|CV'[1]\|\ldots\|CV'[14]\|CV'[15]$).

6. A method of performing a compression operation in a hash algorithm, comprising:
    receiving a message and generating 32, 384-bit extended messages;
    receiving chaining variable data and converting the chaining variable data into 512-bit initial state data;
    repeatedly calculating a step function based on the initial state data and the plurality of extended messages, and then producing final state data, wherein repeatedly calculating the step function and producing the final state data is configured to produce the final state data by repeatedly calculating the step function based on the 512-bit initial state data ($X_0=X_0[0]\|X_0[1]\|\ldots\|X_0[14]\|X_0[15]$) and the 32, 384-bit extended messages ($W_r=W_r[0]\|W_r[1]\|\ldots\|W_r[10]\|W_r[11]$), and
    the step function is a function for calculating the following Equations (1) to (5):

$$T_r[i]=X_r[i]\oplus W_r[i], 0\le i\le 11 \quad (1)$$

$$X_{r+1}[i]=ROL_9(T_r[i]\boxplus T_r[i+4]), 0\le i\le 3 \quad (2)$$

$$X_{r+1}[i]=ROL_{27}(T_r[i]\boxplus T_r[i+4]), 4\le i\le 7 \quad (3)$$

$$X_{r+1}[i]=ROL_{29}(T_r[i]\boxplus X_r[i+4]), 8\le i\le 11 \quad (4)$$

$$X_{r+1}[i]=T_r[i-12], 12\le i\le 15 \quad (5)$$

where $x\oplus y$ denotes an exclusive OR operation on x and y which respectively have 32-bit values, $x\boxplus y$ denotes an operation of outputting a remainder of division when a sum of values representing the 32-bit x and y by positive integers, respectively, is divided by $2^{32}$, in 32 bits, and $ROL_a(x)$ denotes an operation of cyclically shifting the 32-bit x to left by 'a' bits and outputting a shifted value; and
    generating updated chaining variable data from the chaining variable data using the final state data, and outputting the updated chaining variable data.

7. The method of claim 6, wherein generating the plurality of extended messages is configured to receive a 512-bit message ($M=M[0]\|M[1]\|\ldots\|M[14]\|M[15]$) configured by connecting 16, 32-bit sub-messages ($M[0], M[1], \ldots, M[14]$, and $M[15]$), and generate 32, 384-bit extended messages ($W_r=W_r[0]\|W_r[1]\|\ldots\|W_r[10]\|W_r[11]$), each being configured by connecting 12, 32-bit sub-extended messages ($W_r[0], W_r[1], \ldots, W_r[10]$, and $W_r[11]$) based on equation ($W_r[i]=M[(12r+i) \bmod 16], 0\le i\le 11$), where r is an integer satisfying $0\le r\le 31$, and x mod 16 denotes an operation of outputting a remainder of division when x is divided by 16.

8. The method of claim 7, wherein receiving the chaining variable data and converting the chaining variable data into the initial state data is configured to receive 512-bit chaining variable data ($CV=CV[0]\|CV[1]\|\ldots\|CV[14]\|CV[15]$) configured by connecting 16 pieces of 32-bit sub-chaining variable data $CV[0], CV[1], \ldots, CV[14]$, and $CV[15]$), and convert the 512-bit chaining variable data into 512-bit initial state data ($X_0=X_0[0]\|X_0[1]\|\ldots\|X_0[14]\|X_0[15]$) configured by connecting 16 pieces of 32-bit initial sub-state data ($X_0[0], X_0[1], \ldots, X_0[14]$, and $X_0[15]$) based on equation ($X_0[i]=CV[i], 0\le i\le 15$).

9. The method of claim 8, wherein repeatedly calculating the step function and producing the final state data is configured to repeatedly calculate the step function, for r, 32 times from 0 to 31 rounds and produce 512-bit final state data ($X_{32}=X_{32}[0]\|X_{32}[1]\| \ldots \|X_{32}[14]\|X_{32}[15]$) configured by connecting 16 pieces of 32-bit final sub-state data ($X_{32}[0]$, $X_{32}[1], \ldots, X_{32}[14]$, and $X_{32}[15]$).

10. The method of claim 9, wherein generating and outputting the updated chaining variable data from the chaining variable data is configured to update the 512-bit chaining variable data ($CV=CV[0]\|CV[1]\| \ldots \|CV[14]\|CV[15]$) based on equation ($CV'=CV[i]\oplus X_{32}[i], 0\leq i\leq 15$), and output the updated 512-bit chaining variable data ($CV'=CV'[0]\|CV'[1]\| \ldots \|CV'[14]\|CV'[15]$).

\* \* \* \* \*